United States Patent [19]
Kwok

[11] Patent Number: 5,488,792
[45] Date of Patent: Feb. 6, 1996

[54] MOBILE TRAFFIC WARNING SIGN

[76] Inventor: Wang-On Kwok, Flat D, 3rd Floor, No. 172, Wai Yip Street, Kwun Tong, Kowloon, Hong Kong

[21] Appl. No.: 384,879

[22] Filed: Feb. 7, 1995

[51] Int. Cl.[6] ........................................ G09F 7/00
[52] U.S. Cl. ........................... 40/612; 40/610; 116/63 C; 404/6
[58] Field of Search ................... 40/610, 612; 116/63 P, 116/63 C; 404/6, 9, 10, 12

[56] References Cited

U.S. PATENT DOCUMENTS

| | | | |
|---|---|---|---|
| 2,275,711 | 3/1942 | Ybanez | 116/63 C |
| 2,762,328 | 9/1956 | Weig | 116/63 C |
| 3,132,624 | 5/1964 | Shoemaker, Jr. | 116/63 C |
| 5,375,554 | 12/1994 | Yen | 116/63 P |

*Primary Examiner*—Brian K. Green
*Attorney, Agent, or Firm*—Morton J. Rosenberg; David I. Klein

[57] ABSTRACT

A mobile traffic warning sign including a heavy flat base, a conical spring fastened to the base at the top by holding-down plates and screws, and a collapsible conical covering with reflectors covered on the conical spring, and a case for receiving the warning traffic warning sign when the conical covering and the conical spring are collapsed and received in a circular recess on the base.

2 Claims, 4 Drawing Sheets

MOBILE TRAFFIC WARNING SIGN

BACKGROUND OF THE INVENTION

The present invention relates to traffic warning signs, and relates more particularly to a mobile, collapsible traffic warning sign.

Regular mobile traffic warning signs are commonly comprised of a triangular or conical shell molded from rigid plastics and covered with reflectors. A conical shell is more stable than a triangular shell when placed on the ground. However, a conical shell is not collapsible and needs much storage space. If a mobile traffic warning sign of triangular shell is used, it will be blown down by the wind easily.

SUMMARY OF THE INVENTION

The present invention has been accomplished to provide a mobile traffic warning sign which eliminates the aforesaid drawbacks. It is therefore an object of the present invention to provide a mobile traffic warning sign which is collapsible and can be received in a case for carrying by hand when not in use. It is another object of the present invention to provide a mobile traffic warning sign which is stable in use. It is still another object of the present invention to provide a mobile traffic warning sign which is simple in structure and easy to assemble.

According to the present invention, the mobile traffic warning sign is comprised of a heavy flat base, a conical spring secured to the base by holding-down plates and screws, and a conical cloth covering with reflectors covered on the conical spring. When the mobile traffic warning sign is not in use, the conical cloth covering and the conical spring can be collapsed and then received with the base in a case.

DETAILED DESCRIPTION OF THE PREFERRED EMBODIMENTS

Figure 1:
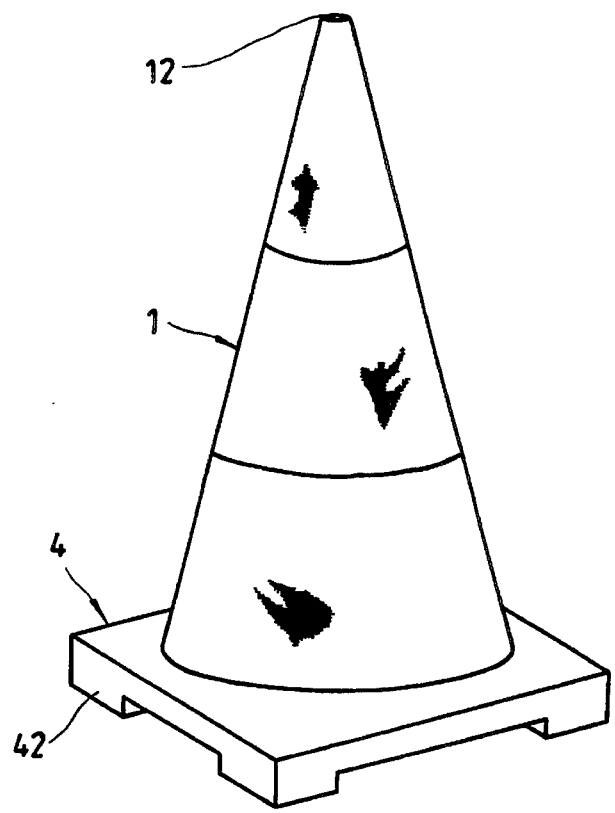
FIG. 1 is an elevational view of a mobile traffic warning sign according to the present invention.
Figure 2:
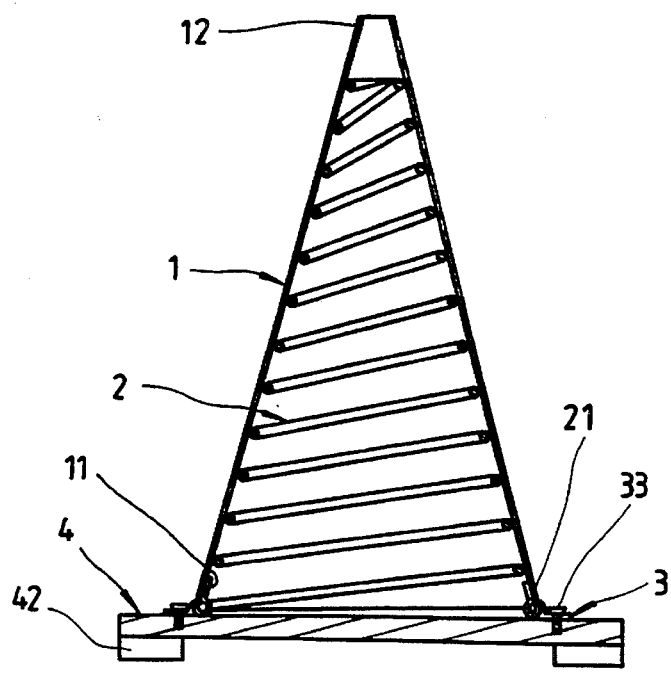
FIG. 2 is a longitudinal view in section of the mobile traffic warning sign shown in FIG. 1.
Figure 3:
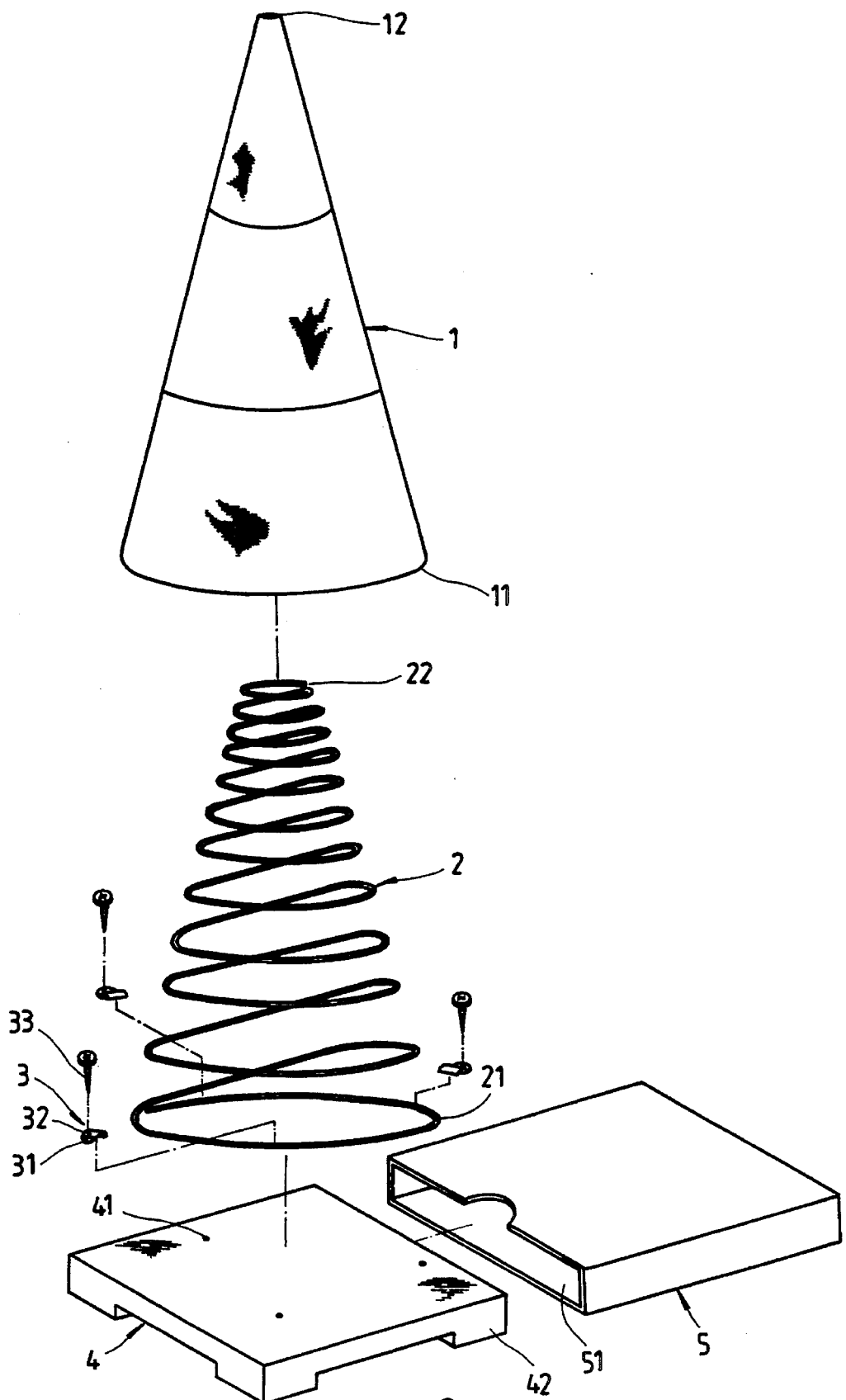
FIG. 3 is an exploded view of the mobile traffic warning sign shown in FIG. 1.
Figure 4:
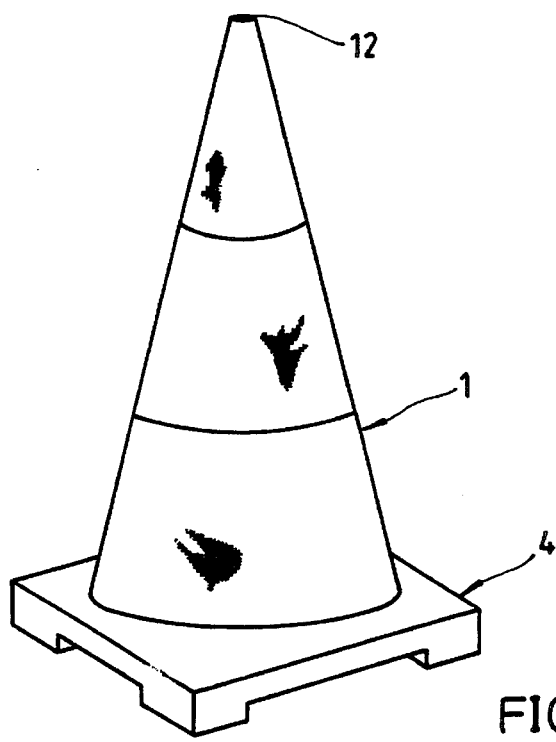
FIG. 4 shows the mobile traffic warning sign of FIG. 1 disposed in the operative position.
Figure 4A:
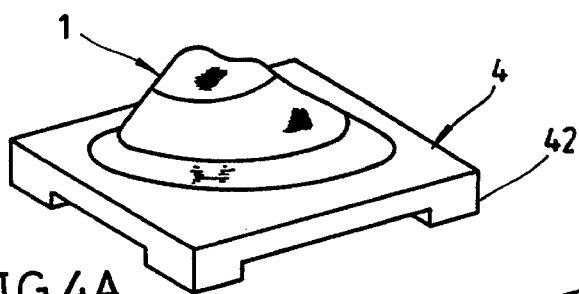
FIG. 4A shows the mobile traffic warning sign of FIG. 1 collapsed (Step I)
Figure 4B:
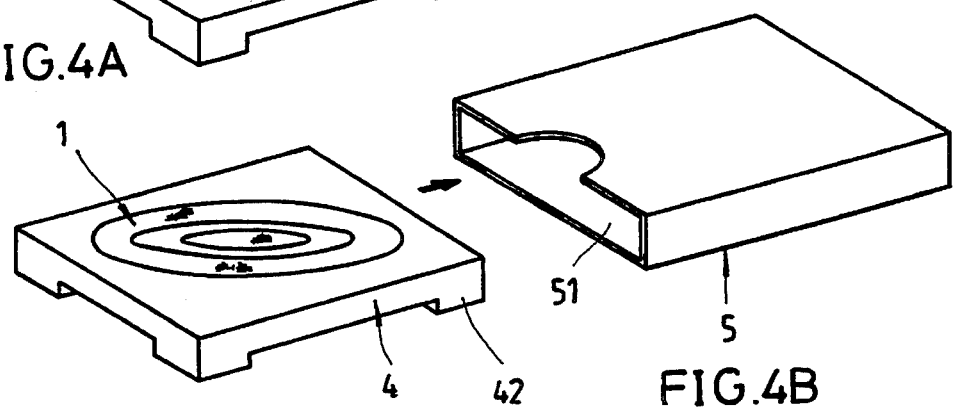
FIG. 4B shows the mobile traffic warning sign of FIG. 1 collapsed (Step II)
Figure 4C:
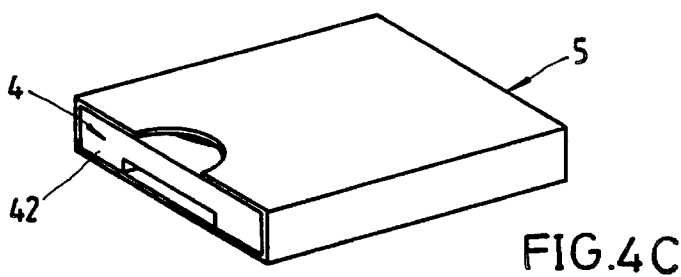
FIG. 4C shows the mobile traffic warning sign of FIG. 1 collapsed and received in the case.

Referring to FIGS. 1, 2, and 3, a traffic warning sign in accordance with one embodiment of the present invention is shown comprised of a covering 1, a conical spring 2, holding-down plates 3, a flat base 4, and a case 5. The covering 1 is made from cloth and shaped like a cone. The outside wall of the covering 1 is properly colored or covered with reflectors to use as a warning sign. The holding-down plates 3 are respectively fastened to respective screw holes 41 on the flat base 4 to hold the conical spring 2 on the flat flat base 4. Each holding-down plate 3 has a through hole 31 securely connected to one screw hole 41 on the flat base 4 by a respective screw 33, and an arched portion 32 bridged over the bottom ring 21 of the conical spring 2 to hold the conical spring 2 and the flat base 4 together. When the covering 1 is covered on the conical spring 2, the bottom side 11 of the covering 1 is covered around the bottom ring 21 of the conical spring 2, and the top ring 22 of the conical spring 2 is stopped at the top end 12 of the covering 1. The flat flat base 4 is made from heavy material of rectangular shape, having four legs 42 respectively raised from the bottom side in the four corners.

Referring to FIGS. 4, 4-1, 4-2, and 4-3, when the traffic warning sign is not in use, it can be collapsed by pressing down the covering 1 and the conical spring 2 into a flat manner, and then the traffic warning sign can be received in the receiving chamber 51 of the case 5.

Figure 5:
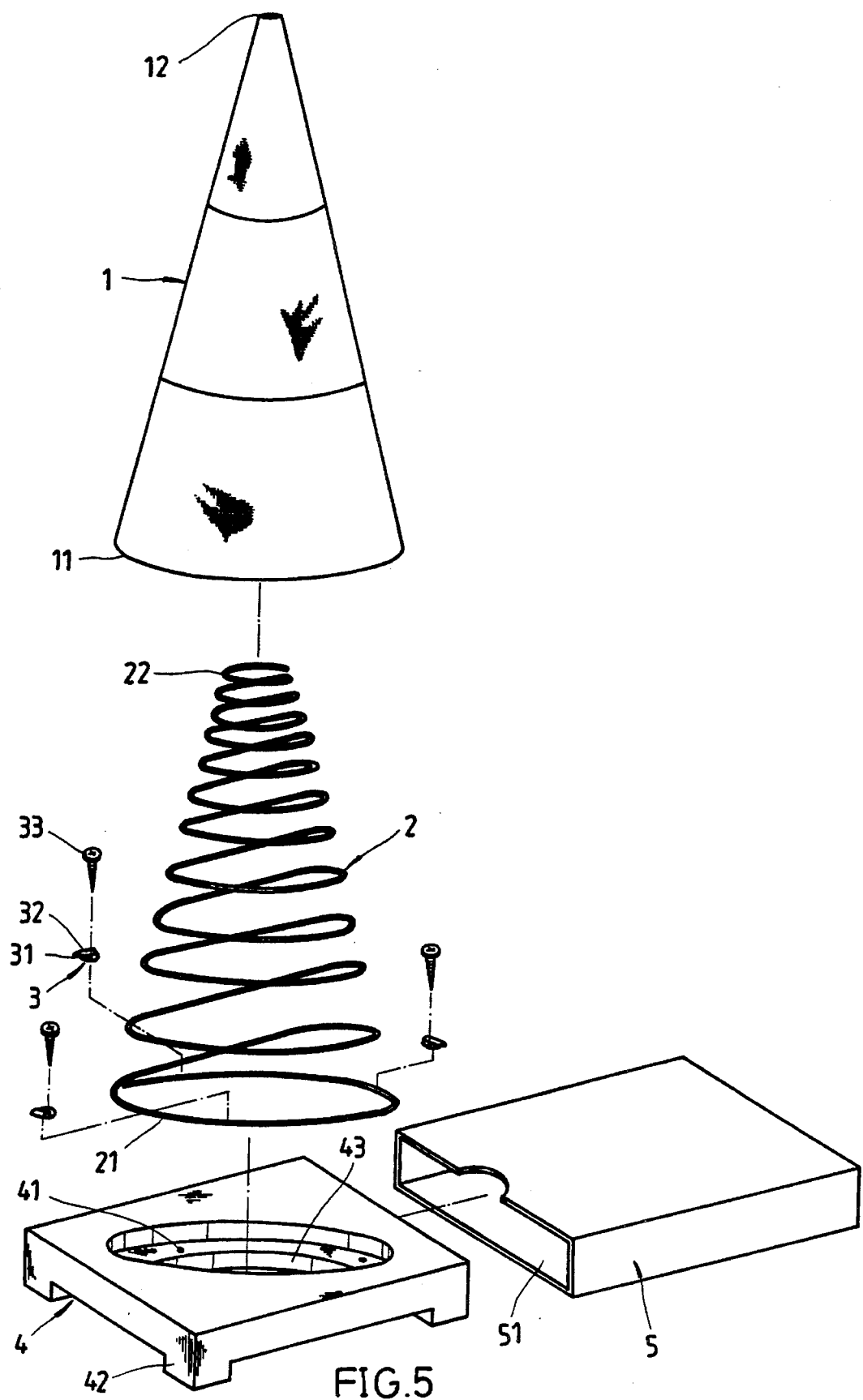
FIG. 5 is an exploded view of an alternate form of the mobile traffic warning sign according to the present invention.

FIG. 5 shows an alternate form of the present invention in which the flat base 4 has a stepped circular recess 41 and 43 at the top side. When the covering 1 and the conical spring 2 are collapsed into a flat manner, they are received within the stepped circular recess 41 and 43 and then inserted with the flat base 4 into the receiving chamber 51 of the case 5.

What is claimed is:

1. A mobile traffic warning sign comprising:
    a flat base made from heavy material of rectangular shape and having a plurality of screw holes at a top side thereof and a plurality of legs at a bottom side thereof;
    a conical spring;
    holding-down plates detachably fixed to the screw holes on said flat base by screws to hold said conical spring on the top side of said flat base;
    a conical covering made from flexible material and covered on said conical spring and having reflector means on an outside; and
    a case for receiving said flat base and said conical spring and said conical covering when said conical covering and said conical spring are collapsed into a flat manner over said flat base.

2. The mobile traffic warning sign of claim 1 wherein said flat base has a circular recess on the top side, which receives said conical covering and said conical spring when they are collapsed.

* * * * *